United States Patent
Choi et al.

(10) Patent No.: US 8,465,554 B2
(45) Date of Patent: Jun. 18, 2013

(54) METHOD OF MANUFACTURING LITHIUM ION CAPACITOR

(75) Inventors: Dong Hyeok Choi, Gyeonggi-do (KR); Bae Kyun Kim, Gyeonggi-do (KR); Hak Kwan Kim, Gyeonggi-do (KR); Ho Jin Yun, Gyeonggi-do (KR); Hong Seok Min, Gyeonggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 316 days.

(21) Appl. No.: 13/025,883

(22) Filed: Feb. 11, 2011

(65) Prior Publication Data

US 2012/0047720 A1    Mar. 1, 2012

(30) Foreign Application Priority Data

Aug. 27, 2010  (KR) .................. 10-2010-0083381

(51) Int. Cl.
*H01G 9/00* (2006.01)
(52) U.S. Cl.
USPC ........................................................ 29/25.03

(58) Field of Classification Search
None
See application file for complete search history.

(56) References Cited

U.S. PATENT DOCUMENTS

| | | | |
|---|---|---|---|
| 7,733,629 B2 * | 6/2010 | Tasaki et al. | 361/502 |
| 2009/0027831 A1 * | 1/2009 | Tasaki et al. | 361/523 |
| 2009/0246629 A1 * | 10/2009 | Nagai et al. | 429/209 |

FOREIGN PATENT DOCUMENTS

JP  2003-051294  2/2003

* cited by examiner

*Primary Examiner* — Seahvosh Nikmanesh
(74) *Attorney, Agent, or Firm* — McDermott Will & Emery LLP

(57) ABSTRACT

Provided is a method of manufacturing a lithium ion capacitor. The method includes the steps of: contacting a lithium supplying source to an anode directly; pre-doping lithium ions into the anode by immerging the anode and the lithium supplying source into a doping electrolyte solution; forming an electrode cell by sequentially stacking the lithium ions on the pre-doped anode and a cathode with placing a separator therebetween; cleaning the doping electrolyte solution absorbed to terminals of the electrode cell; fusing the terminals; and sealing the electrode cell with exposing the fused terminal.

9 Claims, 5 Drawing Sheets

METHOD OF MANUFACTURING LITHIUM ION CAPACITOR

CROSS-REFERENCE TO RELATED APPLICATIONS

This application claims the benefit of Korean Patent Application No. 10-2010-0083381 filed with the Korea Intellectual Property Office on Aug. 27, 2010, the disclosure of which is incorporated herein by reference.

BACKGROUND OF THE INVENTION

1. Field of the Invention

The present invention relates to a lithium ion capacitor, and more particularly, to a method of manufacturing a lithium ion capacitor to perform a cleaning process of a terminal after performing a pre-doping process of lithium ions by allowing an anode to be directly in contact with a lithium supply source.

2. Description of the Related Art

In general, electrochemical energy storage devices are core parts of finished products, which are essentially used in all mobile information communication devices and electronic devices. In addition, the electrochemical energy storage devices will be used as high quality energy sources in new and renewable energy fields that can be applied to future electric vehicles and mobile electronic devices.

The electrochemical capacitor among the electrochemical energy storage devices can be classified into an electrical double layer capacitor using an electrical double layer principle and a hybrid super capacitor using an electrochemical oxidation-reduction reaction.

Here, although the electric double layer capacitor has been used for a field required for a high power energy property, the electric double layer capacitor has a problem such as a small capacitance. On the contrary, the hybrid super capacitor has been studied for a new method to improve the capacitance property of the electric double layer capacitor. Particularly, the lithium ion capacitor (LIC) among the hybrid super capacitors can have an accumulative capacitance in the degree of 3 times to 4 times in comparison with the electric double layer capacitor.

A process of forming the lithium ion capacitor may include a stacking process to form an electrode stacking material by sequentially stacking a cathode with a sheet shape, a separating layer and an anode, a welding process to weld the terminals of the cathode and the terminals of the anode, a pre-treatment doping process to pre-dope the lithium ions into the anode by immerging the electrode stacking material into an electrolyte and a sealing process to seal the electrode stacking material with aluminum.

Here, the process to pre-dope the lithium ions into the anode may be performed by immerging into the electrolyte solution after lithium metal layers are provided on the most top layer and the most bottom layer of the electrode stacking material, respectively.

At this time, in order to smoothly supplying the lithium ions to the anode during the pre-doping process, the collectors provided in the cathode and the anode must have a mesh shape. In this result, there is a problem to increase an inner resistance of the lithium ion capacitor.

And also, since the lithium metal layers are provided on both ends of the electrode stacking material, there is a problem that the lithium ions are uniformly doped into an overall of the stacked anode.

And also, since a time until the lithium ions are uniformly doped into the anode provided inside of the electrode stacking material is approximately 20 days, there is a problem to be applied for a mass production.

SUMMARY OF THE INVENTION

The present invention has been invented in order to overcome the above-described problems generated during a method of manufacturing a lithium ion capacitor and it is, therefore, an object of the present invention to provide a method of manufacturing a lithium ion capacitor to perform a cleaning process to a terminal after performing a pre-doping process to lithium ions by directly contacting a lithium supplying source to a cathode.

In accordance with one aspect of the present invention to achieve the object, there is provided a method of manufacturing a lithium ion capacitor including: contacting a lithium supplying source to an anode directly; pre-doping lithium ions into the anode by immerging the anode and the lithium supplying source into a doping electrolyte solution; forming an electrode cell by sequentially stacking the lithium ions on the pre-doped anode and a cathode with placing a separator therebetween; cleaning the doping electrolyte solution absorbed to terminals of the electrode cell; fusing the terminals; and sealing the electrode cell with exposing the fused terminal.

Here, the step of cleaning the doping electrolyte solution absorbed to terminals of the electrode cell is performed through an ultrasonic cleaning after the electrode cell is immerged into the cleaning solution.

And also, the cleaning solution includes any one or two or more among acetone and diethyl carbonate.

And also, the step of cleaning the doping electrolyte solution absorbed to terminals of the electrode cell includes the steps of: a first ultrasonic cleaning step of removing salt absorbed to the terminal; and a second ultrasonic cleaning step of removing solvent absorbed to the terminal.

And also, the lithium supplying source comprises any one of a lithium metal, an oxide including lithium and a lithium alloy including lithium.

And also, the anode includes an anode collector and an anode active material layer formed on both surfaces of the anode collector, and the anode collector has a shape of sheet without holes.

And also, the cathode includes a cathode collector and a cathode active material layer formed on both surfaces of the cathode collector, and the cathode collector has a shape of sheet without holes.

And also, the step of contacting a lithium supplying source to an anode directly includes a step of stacking the anode and the lithium supplying source alternately.

And also, after the step of cleaning the doping electrolyte solution absorbed to the terminals of the electrode cell, further comprising a step of drying the electrode cell.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Figure 1:
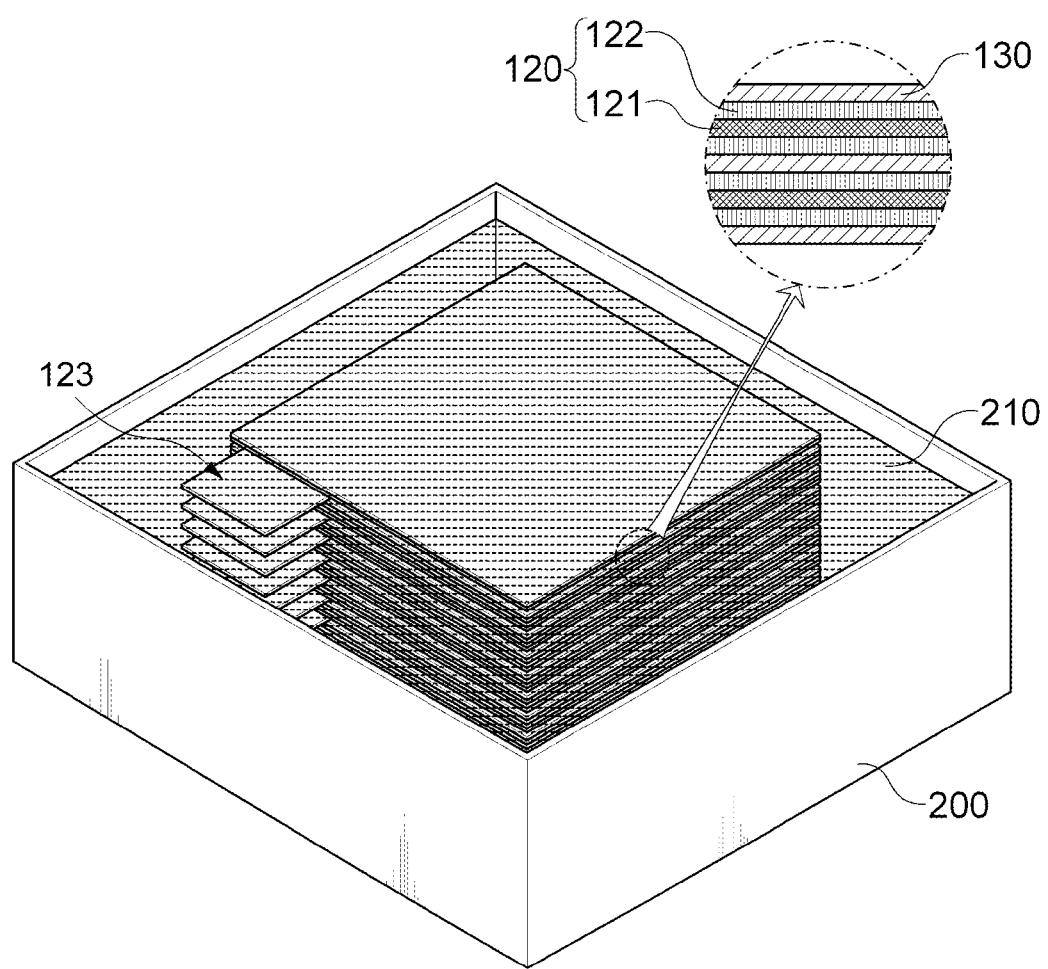
FIGS. 1 to 5 are perspective views for explaining a process of manufacturing a lithium ion capacitor in accordance with embodiments of the present invention.

Hereinafter, embodiments of the present invention for a lithium ion capacitor will be described in detail with reference to the accompanying drawings. The following embodiments are provided as examples to fully convey the spirit of the invention to those skilled in the art.

Therefore, the present invention should not be construed as limited to the embodiments set forth herein and may be embodied in different forms. And, the size and the thickness of an apparatus may be overdrawn in the drawings for the convenience of explanation. The same components are represented by the same reference numerals hereinafter.

FIGS. 1 to 5 are perspective views for explaining a process of manufacturing a lithium ion capacitor in accordance with embodiments of the present invention.

Referring to FIG. 1, in order to manufacture the lithium ion capacitor in accordance with the embodiments of the present invention, a cathode 120 and a lithium supplying source 130 are in contact with each other at first.

Here, the anode 120 may include an anode collector 121 and an anode active material layer 122 disposed on both surfaces of the anode collector 121, respectively.

The anode collector 121 may be a foil made of at least one among copper and nickel. At this time, the anode collector 121 may have a sheet shape without having holes substituted for a mesh shape in order to reduce an inner resistance of the lithium ion capacitor.

The anode active material layer 122 may be a carbon material, e.g., graphite, capable of doping and de-doping the lithium ions reversibly. In addition, the anode active material layer 122 may further include a binder.

The anode 120 may include an anode terminal 123 to be in contact with an external power source. Here, the anode terminal 123 may be formed by being extended from one side of the anode collector 121.

And also, the lithium supplying source 130 may play a role of supplying the lithium ions to the anode 120. Here, the lithium supplying source 130 may include any one among lithium metal, a lithium oxide including the lithium and a lithium alloy including the lithium.

If the anode 120 provides the anode active material layer 122 on both surfaces of the anode collector 121, the lithium supplying source 130 may be contact with both surfaces of the anode 120. At this time, the anode 120 and the lithium supplying source 130 can be alternately stacked by using a stacking jig. Accordingly, the lithium ions can be pre-doped into the plurality of anodes 120 at one process.

Meanwhile, there is provided a doping bath 200 to receive a doping electrolyte solution 210. Here, the doping electrolyte solution 210 may play a role of medium capable of moving the lithium ions in the pre-doping process of the lithium ions.

The doping electrolyte solution 210 may include an electrolyte and solvent. The electrolyte may be a state of salt, e.g., lithium salt or ammonium salt or the like. The example of the solvent may be propylene carbonate, dimethyl carbonate, ethylene carbonate, sulfolane, acetonitrile, dimethoxy ethane and tetrahydrofuran or the like. Here, the solvent may be used by mixing one or two or more. However, in the embodiments of the present invention, the material of the doping electrolyte solution is not limited, but any material capable of moving the lithium ions can be allowable.

Thereafter, the anode 120 and the lithium supplying source 130 to be contact with each other are immerged into the doping electrolyte solution 210. Here, as the anode 120 and the lithium supplying source 130 have a potential difference, when the anode 120 and the lithium supplying source 130 are in contact with each other, i.e., electrically shorted, the lithium ions can be doped from the lithium supplying source 130 to the anode 120. At this time, as the anode 120 and the lithium supplying source 130 are directly in contact with each other, the doping time can be shorten in comparison with a pre-doping process of the lithium ions through a conventional charging/discharging.

And also, since the electrode cell can be formed after the lithium ions are pre-doped into the anode 120, respectively, the lithium ions can be uniformly pre-doped into the anode 120 in comparison with a case that the lithium ions are pre-doped into an anode after a conventional electrode cell is formed.

And then, after the pre-doping process of the lithium ions is finished, if the lithium supplying source 130 remains, a process to separate the lithium supplying source 130 from the anode may be further performed.

Figure 2:
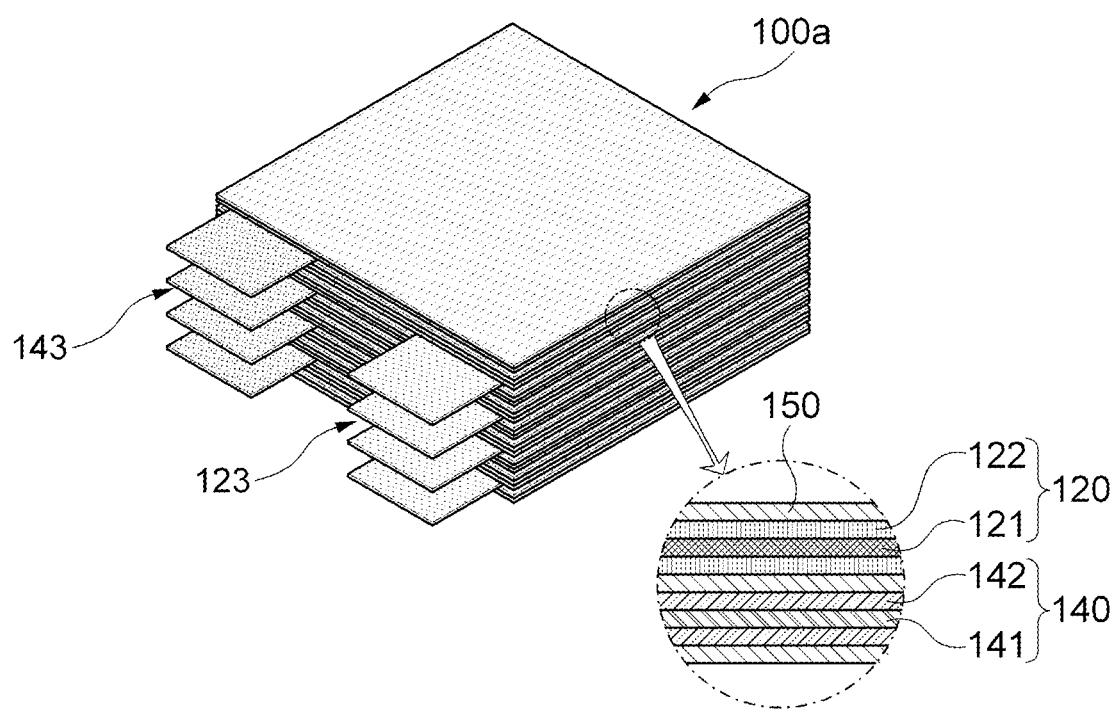

Referring to FIG. 2, after the lithium ions are pre-doped into the anode 120, the electrode cell 100a is formed by sequentially stacking the anode 120 pre-doped therein the lithium ions and a cathode 140 with placing a separator 150 therebetween.

Here, the separator 150 may play a role of electrically separating the anode 120 and the cathode 140. Although the separator 150 may be a paper or fabric, in the embodiments of the present invention, the type of the separator 150 is not limited to this.

The cathode 140 may include a cathode collector 141 and a cathode active material layer 142 disposed on both surfaces of the cathode collector 141. Here, the cathode collector 141 may be formed of a foil made of any one among aluminum, titan, niobium and tantalum. At this time, the cathode collector 141 may have a shape of sheet without holes substitute for a mesh shape in order to reduce an inner resistance of the lithium ion capacitor.

And also, the cathode active material layer 142 may include a carbon material, i.e., charcoal, capable of doping and de-doping the lithium ions reversibly. In addition, the cathode active material layer 142 may further include a binder.

The cathode 140 may include a plurality of cathode terminals 143 to be connected to an external power. At this time, the cathode terminals 143 may be formed by being extended from one side of the cathode collector 141.

The cathode terminals 143 and the anode terminals 123 may be sequentially stacked respectively by stacking the cathode 140 and the anode 120 to form the electrode cell 100a. At this time, the cathode terminals 143 and the anode terminals are disposed so as to be separated from each other, thereby being electrically separated from each other.

Here, the doping electrolyte solution may be absorbed to the anode terminals 123 during the pre-doping process of the anode 120. The fusion failure of the anode terminals 123 may be caused due to the doping electrolyte solution during the fusion process of the terminals as a following process.

Figure 3:
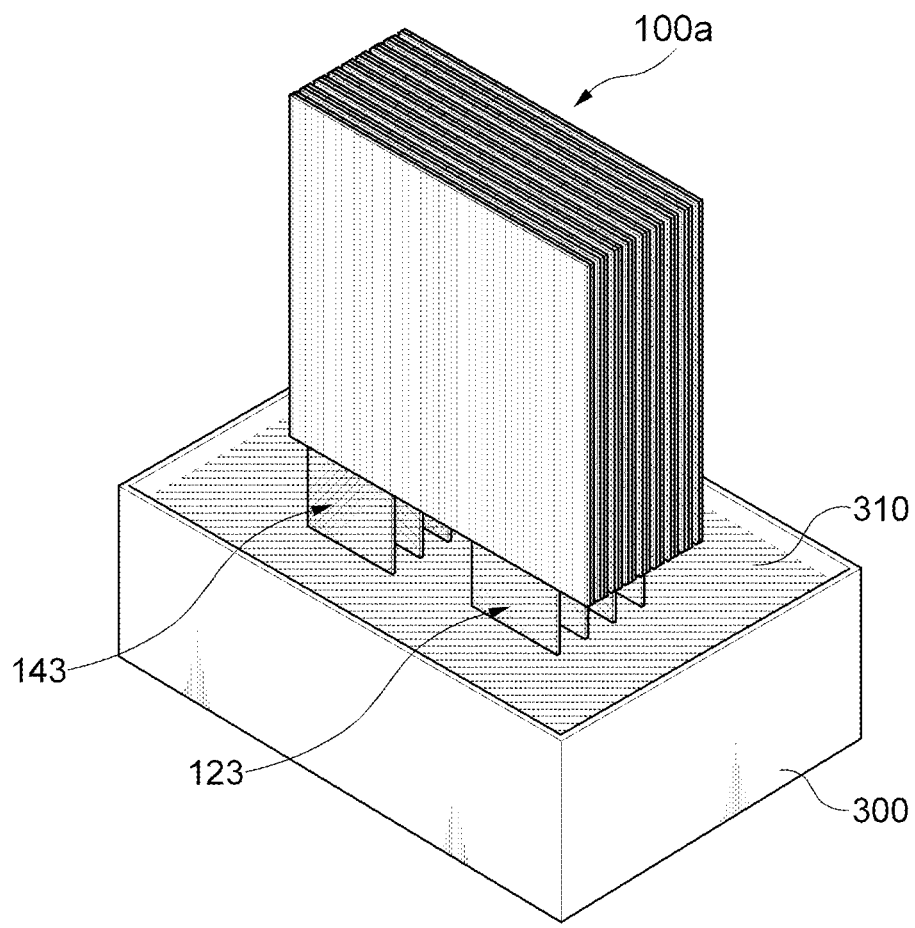

Referring to FIG. 3, the doping electrolyte solution absorbed to the anode terminals 123 may be removed by ultrasonic cleaning the anode terminals 123 of the electrode cell 100a.

Here, the ultrasonic cleaning may be performed after the anode terminals 123 of the electrode cell 100a are immerged into the cleaning solution 310 in the cleaning bath 300. At this time, the cleaning solution 310 may be a mixed solution selected from any one or two among acetone and diethyl carbonate.

The ultrasonic cleaning can include at least two cleaning processes, e.g., a first ultrasonic cleaning process and a second ultrasonic cleaning process. Here, the first ultrasonic cleaning process may be preceded at a state that the anode terminals 123 are immerged into the diethyl carbonate in order to remove the salt of the doping electrolyte solution. And also, the second ultrasonic cleaning process may be preceded at a state that the anode terminals 123 are immerged into the acetone in order to remove the solvent of the doping electrolyte solution.

In addition, since the ultrasonic cleaning is performed to the cathode terminals 143 at the same time, the contaminated material attached to the cathode terminals 143 may be removed together, whereby the fusion failure of the cathode terminals 143 due to the contaminated material can be prevented.

Thereafter, the terminals of the electrode cell 100a can further perform a drying process to remove the cleaning solution absorbed to the terminals after the ultrasonic cleaning.

Figure 4:
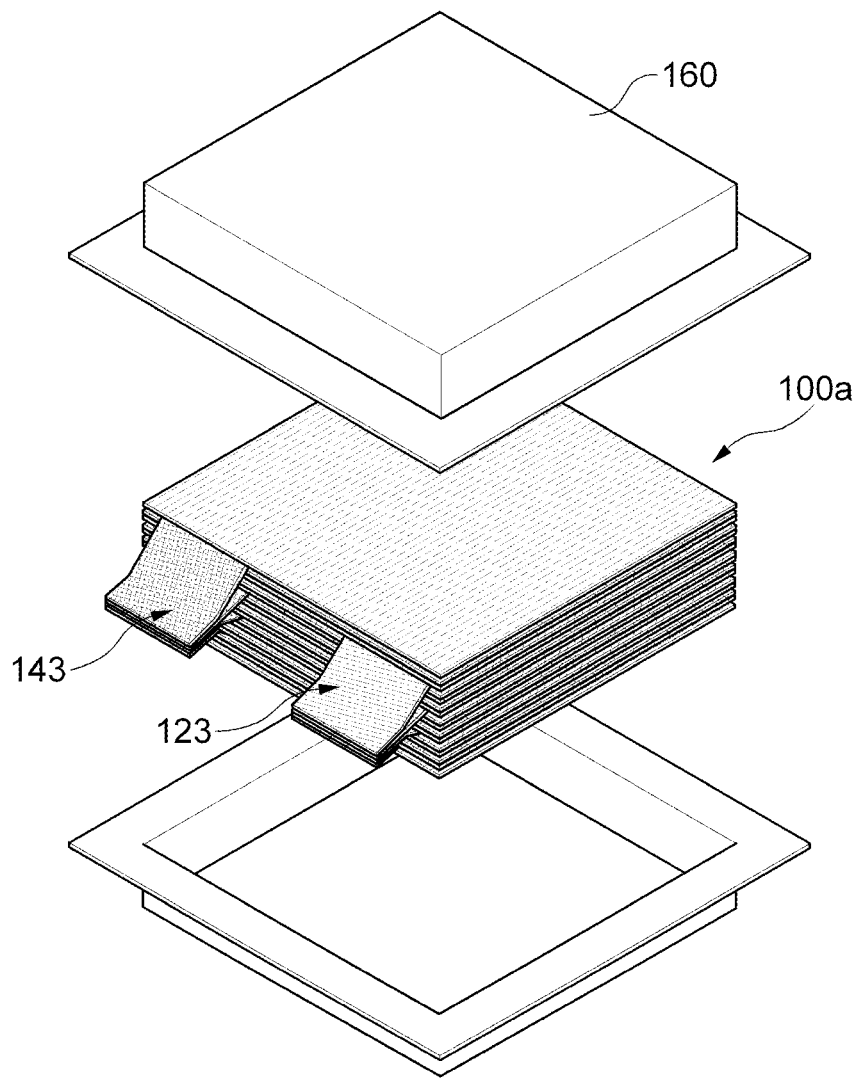
Figure 5:
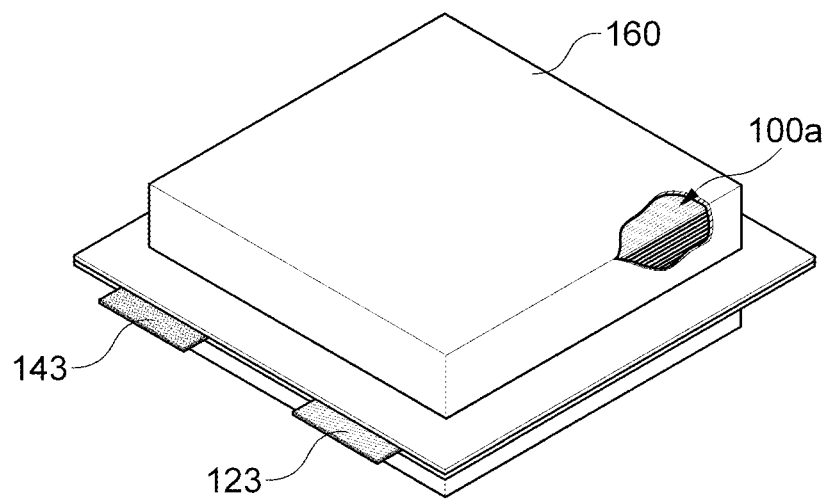

Referring to FIG. 4, after removing the doping electrolyte solution absorbed to the anode terminals 123 through the ultrasonic cleanings, the plurality of stacked cathode terminals 123 and the plurality of stacked cathode terminals 143 are fused respectively, thereby being integrated as one body. As removing the doping electrolyte solution absorbed to the anode terminals 123 with the ultrasonic cleanings, the fusion failure of the anode terminals 123 can be prevented.

Although the example of the fusion process is an ultrasonic welding, a laser welding and a pot welding or the like, but it is not limited to this in the embodiments of the present invention.

Thereafter, the electrode cell 100a is sealed by using an external laminate film 160. Here, although the external laminate film 160 is made of aluminum, but it is not limited to this in the embodiments of the present invention.

Specifically, explaining the sealing process of the electrode cell, at first, the external laminate films 160 are provided in a top and a bottom with placing the electrode cell 100a therebetween. After, by thermal fusing the pair of laminate films 160, the electrode cell 100a may be sealed by the external laminate films 160. At this time, the fused cathode terminals 143 and the anode terminals 123 are exposed from the external laminate films 160 to be electrically connected to the external power.

Here, as the thermal fusion process is proceeded along the edge of the pair of external laminate films 160, it is proceeded to remain a gap for inserting the electrolyte into the electrode cell 100a inserted between the pair of external laminate films 160.

Here, as the electrolyte solution plays a role of medium capable of moving the lithium ions, it can be made of a material capable of keeping the lithium ions stable without generating electrolysis under a high voltage. The electrolyte solution may include an electrolyte and a solvent. The electrolyte may be a state of salt, e.g., lithium salt or ammonium salt or the like. The example of the solvent may be propylene carbonate, dimethyl carbonate, ethylene carbonate, sulfolane, acetonitrile, dimethoxy ethane and tetrahydrofuran or the like. Here, the solvent may be used by mixing one or two or more. However, in the embodiments of the present invention, the material of the doping electrolyte solution is not limited, but any material capable of moving the lithium ions can be allowable. Here, the electrolyte solution may use the same material of the doping electrolyte solution used in the pre-doping process of the lithium ions or a different material.

After the electrolyte is inserted into the gap, by vacuum sealing the gap, the lithium ion capacitor 100 may be formed.

Accordingly, in accordance with the embodiments of the present invention, the pre-doping process time may be reduced by pre-doping the lithium ions by directly contacting the lithium supplying source to the anode, thereby allowing the application of mass production.

And also, since the lithium ion capacitor of the present invention the collectors may be a shape without holes by pre-doping the lithium ions by directly contacting the lithium supplying source to the anode, the inner resistance of the lithium ion capacitor may be reduced.

And also, as the stacked cell is formed after the lithium ion capacitor of the present invention makes the lithium ions to be pre-doped by directly contacting the lithium supplying source to the anode, the lithium ions can be uniformly pre-doped to each of the anodes.

And also, after the lithium ion capacitor of the present invention proceeds the pre-doping process of the lithium ions, as removing the electrolyte absorbed to the terminals through the cleaning process of the terminals, the fusion failure of the terminals can be prevented.

As described above, although the preferable embodiments of the present invention have been shown and described, it will be appreciated by those skilled in the art that substitutions, modifications and variations may be made in these embodiments without departing from the principles and spirit of the general inventive concept, the scope of which is defined in the appended claims and their equivalents.

What is claimed is:

1. A method of manufacturing a lithium ion capacitor comprising:
    contacting a lithium supplying source to an anode directly;
    pre-doping lithium ions into the anode by immerging the anode and the lithium supplying source into a doping electrolyte solution;
    forming an electrode cell by sequentially stacking the lithium ions on the pre-doped anode and a cathode with placing a separator therebetween;
    cleaning the doping electrolyte solution absorbed to terminals of the electrode cell;
    fusing the terminals; and
    sealing the electrode cell with exposing the fused terminal.

2. The method of manufacturing a lithium ion capacitor according to claim 1, wherein the step of cleaning the doping electrolyte solution absorbed to terminals of the electrode cell is performed through an ultrasonic cleaning after the electrode cell is immerged into the cleaning solution.

3. The method of manufacturing a lithium ion capacitor according to claim 2, wherein the cleaning solution includes any one or two or more among acetone and diethyl carbonate.

4. The method of manufacturing a lithium ion capacitor according to claim 1, wherein the step of cleaning the doping electrolyte solution absorbed to terminals of the electrode cell includes the steps of:
    a first ultrasonic cleaning step of removing salt absorbed to the terminal; and
    a second ultrasonic cleaning step of removing solvent absorbed to the terminal.

5. The method of manufacturing a lithium ion capacitor according to claim 1, wherein the lithium supplying source comprises any one of a lithium metal, an oxide including lithium and a lithium alloy including lithium.

6. The method of manufacturing a lithium ion capacitor according to claim 1, wherein the anode includes an anode collector and an anode active material layer formed on both surfaces of the anode collector, and the anode collector has a shape of sheet without holes.

7. The method of manufacturing a lithium ion capacitor according to claim 1, wherein the cathode includes a cathode collector and a cathode active material layer formed on both surfaces of the cathode collector, and the cathode collector has a shape of sheet without holes.

8. The method of manufacturing a lithium ion capacitor according to claim 1, wherein the step of contacting a lithium supplying source to an anode directly includes a step of stacking the anode and the lithium supplying source alternately.

9. The method of manufacturing a lithium ion capacitor according to claim 1, after the step of cleaning the doping electrolyte solution absorbed to the terminals of the electrode cell, further comprising a step of drying the electrode cell.

* * * * *